April 7, 1931.   J. R. LANG ET AL   1,799,426
FUEL INLET VALVE
Filed Jan. 2, 1929

INVENTOR.
J. R. Lang
BY  G. H. Murrin
Munn & Co.
ATTORNEYS.

Patented Apr. 7, 1931

1,799,426

UNITED STATES PATENT OFFICE

JOHN R. LANG AND GAHLBETH HUGH MURRIN, OF RENO, NEVADA

FUEL-INLET VALVE

Application filed January 2, 1929. Serial No. 329,849.

Our invention relates to improvements in fuel inlet valves and it consists in the combinations, constructions and arrangements hereinafter described and claimed.

An object of our invention is to provide a fuel inlet valve which is simple in construction and efficient in operative results for evenly distributing gas through both arms of the intake manifold in such a manner as to supply all of the cylinders with an equal amount of fuel, thereby materially increasing the horsepower obtained from the same amount of fuel expended.

Other objects and advantages will appear in the following specification, and the novel features of our invention will be particularly pointed out in the appended claims.

Figure 1:
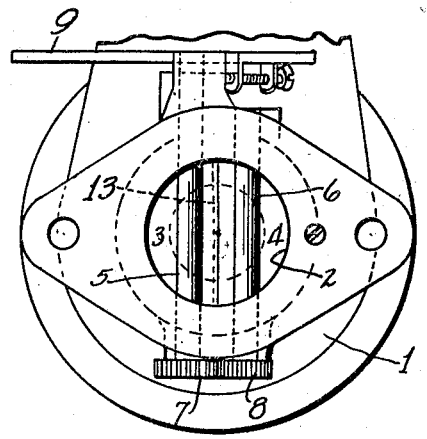
Figure 3:
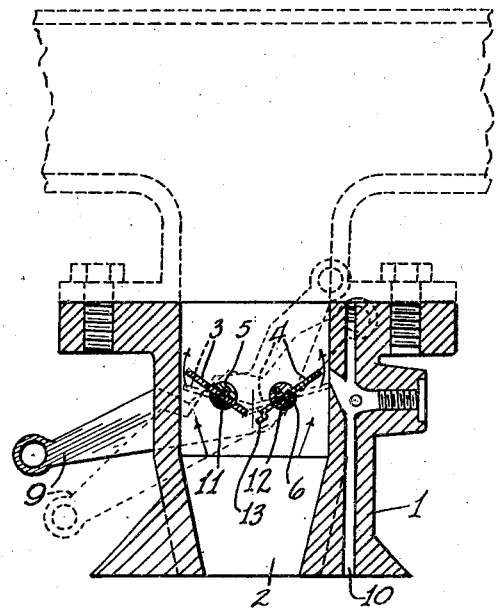
Figure 2:
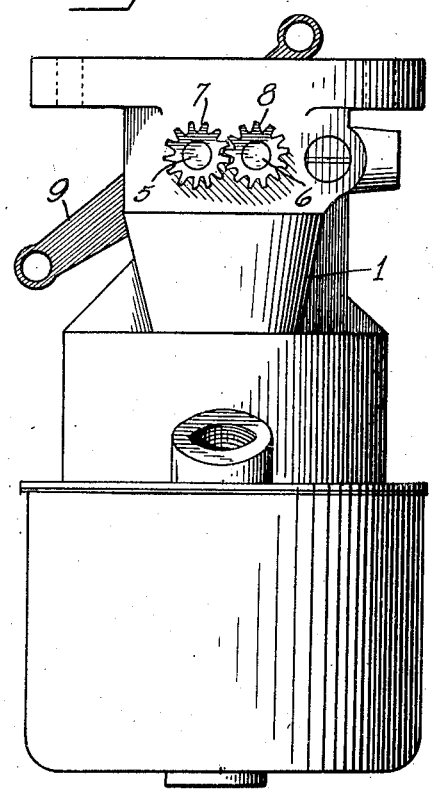
Figure 4:
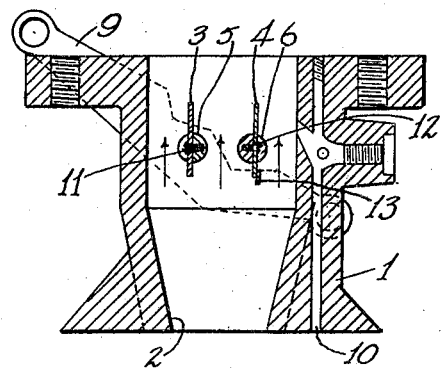

Our invention is illustrated in the accompanying drawing forming a part of this application, in which Figure 1 is a top plan view of the device;
Figure 2 is a front elevation thereof;
Figure 3 is a section through the device; and
Figure 4 is a similar section, but showing the valve parts in a different position.

In carrying out our invention, we provide a valve body 1, having a throat 2 and valves 3 and 4. The valves are mounted on shafts 5 and 6, and these shafts are journaled in the body 1. Figure 2 clearly shows how the two shafts 5 and 6 are geared together by pinions 7 and 8.

An arm 9 is secured to the shaft 5, and this arm is connected by means not shown to the accelerator pedal. It will be seen from this construction that both valves open simultaneously, so that openings are provided at the two sides of the throat 2 and at the center. Figure 3 shows the arm 9 in dotted line position, which represents the position of the arm with the valves in closed position; and the same figure further shows the arm in full line position, which represents the valves partially opened. In Figure 4, the arm has been swung into one of its extreme positions, and the valves 3 and 4 are shown wide open.

A passageway 10 extends through the body 1 and empties into the throat 2 at a point above the valves. This passage is used for permitting gas to pass above the valves when the engine is idling.

From the foregoing description of the various parts of the device, the operation thereof may be readily understood.

This type of valve is an improvement over others in that the fuel from the carburetor is evenly diffused through the manifold as it is passed on through the valves. In the case of ordinary valves now in general use with but one circular disk, most of the fuel is admitted to the manifold on one side only, thus reaching the cylinders on that side in much larger quantities than on the other.

The valves 3 and 4 are secured to the shafts 5 and 6 by screws 11 and 12, or other suitable fastening means. The valve 4 has a lip 13 for abutting the valve 3 when the two valves are in closed position. This lip acts as a stop for limiting the movement of the valves beyond closed position.

Although we have shown and described one embodiment of our invention, it is to be understood that the same is susceptible of various changes and we reserve the right to employ such changes as may come within the scope of the appended claims.

We claim:

1. A valve body having a passageway therein and two valves cooperating with each other for closing off the passageway and for simultaneously opening the passageway along diametrically opposed portions and at the center of the valve body.

2. A valve body for carburetors comprising a casting having an unobstructed throat except for the valves, a pair of semi-circular valves rotatably mounted in the throat, a shaft supporting each valve, means connecting the shafts together and being disposed exteriorly of the throat, said means opening both valves simultaneously and swinging them so that the center and two diametrical opposed portions of the pipe are opened simultaneously.

JOHN R. LANG.
GAHLBETH HUGH MURRIN.